United States Patent [19]
Dunaway

[11] Patent Number: 5,450,079
[45] Date of Patent: Sep. 12, 1995

[54] MULTIMODAL REMOTE CONTROL DEVICE HAVING ELECTRICALLY ALTERABLE KEYPAD DESIGNATIONS

[75] Inventor: Lester W. Dunaway, Kennesaw, Ga.

[73] Assignee: International Business Machines Corporation, Armonk, N.Y.

[21] Appl. No.: 301,513

[22] Filed: Sep. 7, 1994

Related U.S. Application Data

[63] Continuation of Ser. No. 867,652, Apr. 13, 1992.

[51] Int. Cl.$^6$ ............................................. H03K 17/94
[52] U.S. Cl. ........................................ 341/23; 345/169
[58] Field of Search ............... 341/23, 176; 455/151.4; 348/734; 345/169; 359/148; 364/709.14; 340/825.57, 825.69, 825.72

[56] References Cited

U.S. PATENT DOCUMENTS

| | | | |
|---|---|---|---|
| 4,280,121 | 7/1981 | Crask | 341/23 |
| 4,626,848 | 12/1986 | Ehlers | 340/825.69 |
| 4,712,105 | 12/1987 | Köhler | 340/825.69 |
| 4,771,283 | 9/1988 | Imoto | 340/825.71 |

FOREIGN PATENT DOCUMENTS

| | | |
|---|---|---|
| 314177 | 5/1989 | European Pat. Off. . |
| 3821355 | 12/1989 | Germany . |

OTHER PUBLICATIONS

Transportation Electronics: Proceedings of the International Congress on Transportation Electronics, Oct. 1986, pp. 99–106, Kawata et al. "Digital LSI: The Key To Refining The Automotive Audio System".

Patent Abstracts of Japan, vol. 9, No. 123 (E-317) May 28, 1985 Pioneer et al. "Centralized Control System For Electronic Device Or The Like".

Primary Examiner—John K. Peng
Assistant Examiner—Thomas J. Mullen, Jr.
Attorney, Agent, or Firm—Kenneth A. Seaman; Andrew J. Dillon

[57] ABSTRACT

A multimodal hand-held remote control device is disclosed which may be utilized for selecting designated functions in a plurality of multimedia processing units. Multiple user selectable keypads are provided for initiating transmission of control signals utilizing a wireless transmission system, such as an infrared transmitter. An electrically alterable graphic designation is provided in association with each user selectable keypad so that a function associated with each particular keypad for a given multimedia processing unit may be visually determined. The electrically alterable graphic designation is then varied in response to selection of an alternate mode of operation wherein the functions associated with each user selectable keypad for an alternate multimedia processing unit may be displayed. In one depicted embodiment a liquid crystal display is provided and a touch overlay is mounted in an overlying relationship with a portion of the liquid crystal display to provide the user selectable keypads. Selected menus and textual help messages may be loaded into the remote control device utilizing an infrared receiver, or an interface connection to a host device.

7 Claims, 5 Drawing Sheets

MULTIMODAL REMOTE CONTROL DEVICE HAVING ELECTRICALLY ALTERABLE KEYPAD DESIGNATIONS

This is a continuation of application Ser. No. 07/867,652, 13 Apr. 1992.

BACKGROUND OF THE INVENTION

1. Technical Field

The present invention relates in general to improvements in remote control devices and in particular to improvements in remote control devices which may be utilized with multiple multimedia processing units. Still more particularly, the present invention relates to multimodal remote control devices which include electrically alterable keypad designations.

2. Description of the Related Art

Modern state-of-the-art electronic systems often utilize remote control devices to permit a user to rapidly and efficiently control selected functions from a distance. Early mechanical/ultrasonic remote control devices were fairly limited and generally permitted only one or two functions to be controlled. For example, television remote controls utilizing mechanical/ultrasonic technology generally permitted a user to turn the power on to the television and to cycle through each channel in a preselected rotation.

More recently modern remote control devices utilize electronic systems to transmit control signals by way of infrared or radio frequency transmitters. Indeed, as the functionality and complexity of home electronic systems have increased, modern remote control devices have become highly complex. It is not unusual for such a device to include as many as one hundred small buttons or keys, resulting in a severe decrease in the usability of these devices. Further, remote control devices may be utilized to control a wide diversity of electronic systems, such as: television; tape recorders; audio/video amplifiers; compact disc players; video tape recorders; satellite receivers, and the like. Thus, the number and complexity of remote control devices typically found in a modern American home have reached a level where the convenience provided is often overcome by the difficulty in locating and operating these devices.

Recently an attempt has been made to consolidate multiple remote control devices and improve their usability in the provision of a so-called "universal" remote control which can "learn" a series of commands for selecting designated functions within one or more multimedia processing units. However, the generic keypads provided with these devices are often cumbersome and not particularly intuitive in layout or labeling.

Thus, it should be apparent that a need exists for a multimodal remote control device which provides an intuitive and simple interface whereby a user may rapidly and efficiently control multiple multimedia processing units.

SUMMARY OF THE INVENTION

It is therefore one object of the present invention to provide an improved remote control device.

It is another object of the present invention to provide an improved remote control device which may be utilized with multimedia processing units.

It is yet another object of the present invention to provide an improved multimodal remote control device which includes electrically alterable keypad designations.

The foregoing objects are achieved as is now described. A multimodal hand-held remote control device is disclosed which may be utilized for selecting designated functions in a plurality of multimedia processing units. Multiple user selectable keypads are provided for initiating transmission of control signals utilizing a wireless transmission system, such as an infrared transmitter. An electrically alterable graphic designation is provided in association with each user selectable keypad so that a function associated with each particular keypad for a given multimedia processing unit may be visually determined. The electrically alterable graphic designation is then varied in response to selection of an alternate mode of operation wherein the functions associated with each user selectable keypad for an alternate multimedia processing unit may be displayed. In one depicted embodiment a liquid crystal display is provided and a touch overlay is mounted in an overlying relationship with a portion of the liquid crystal display to provide the user selectable keypads. Selected menus and textual help messages may be loaded into the remote control device utilizing an infrared receiver, or an interface connection to a host device and selectively displayed to a user in response to user inputs.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
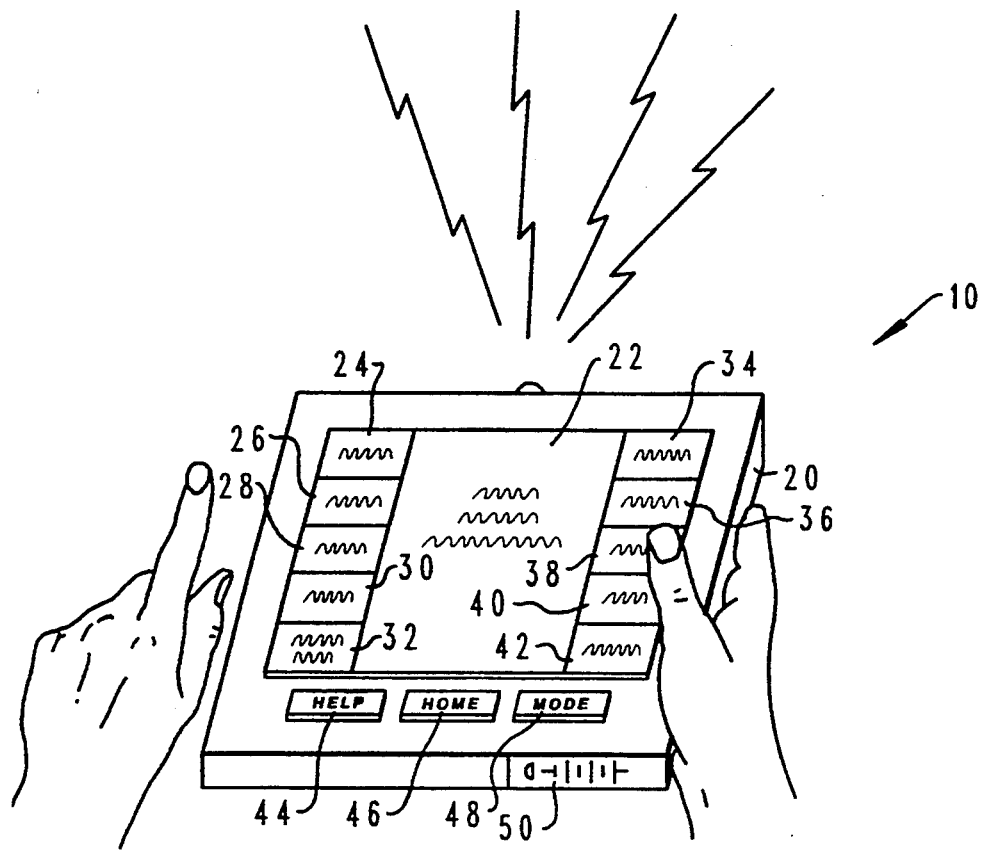
FIG. 1 is a partially schematic, pictorial representation of the multimodal remote control device of the present invention and a plurality of multimedia processing units.

With reference now to the figures and in particular with reference to FIG. 1, there is depicted a partially schematic pictorial representation of the multimodal remote control device 10 of the present invention. As illustrated, multimodal remote control device 10 is preferably a hand-held battery powered portable device which may be utilized to control a plurality of multimedia processing units, such as compact disc player 12, video tape recorder 14, television 16, and a satellite receiver, such as an Integrated Receiver/Decoder (IRD) 18. In the depicted embodiment of the present invention, multimodal remote control device 10 is preferably provided within a case 20 which is constructed utilizing plastic or any other suitable sturdy material.

As illustrated, multimodal remote control device 10 preferably includes a graphic display 22 and a plurality of user selectable keypads 24, 26, 28, 30, 32, 34, 36, 38, 40, and 42. Additionally, selected command keys are provided, such as HELP key 44, HOME key 46, and MODE key 48. A battery compartment is provided which may be utilized to house battery 50 which may be utilized to provide electrical power for multimodal remote control device 10 in a manner well known in the art.

As will be illustrated in greater detail herein, each of the plurality of user selectable keypads 24-42 includes associated therewith a graphic designation which identifies a particular function of a multimedia processing unit which may be selected upon operation of an associated user selectable keypad. Additionally, graphic display 22 is provided for the provision of textual help messages. Graphic display 22 is preferably provided utilizing a liquid crystal display or gas plasma display, or any other suitable state-of-the-art display device. In a preferred embodiment of the present invention, graphic display 22 is provided utilizing any technology which requires minimal electrical power, thereby diminishing the power drain on battery 50.

Figure 2A:
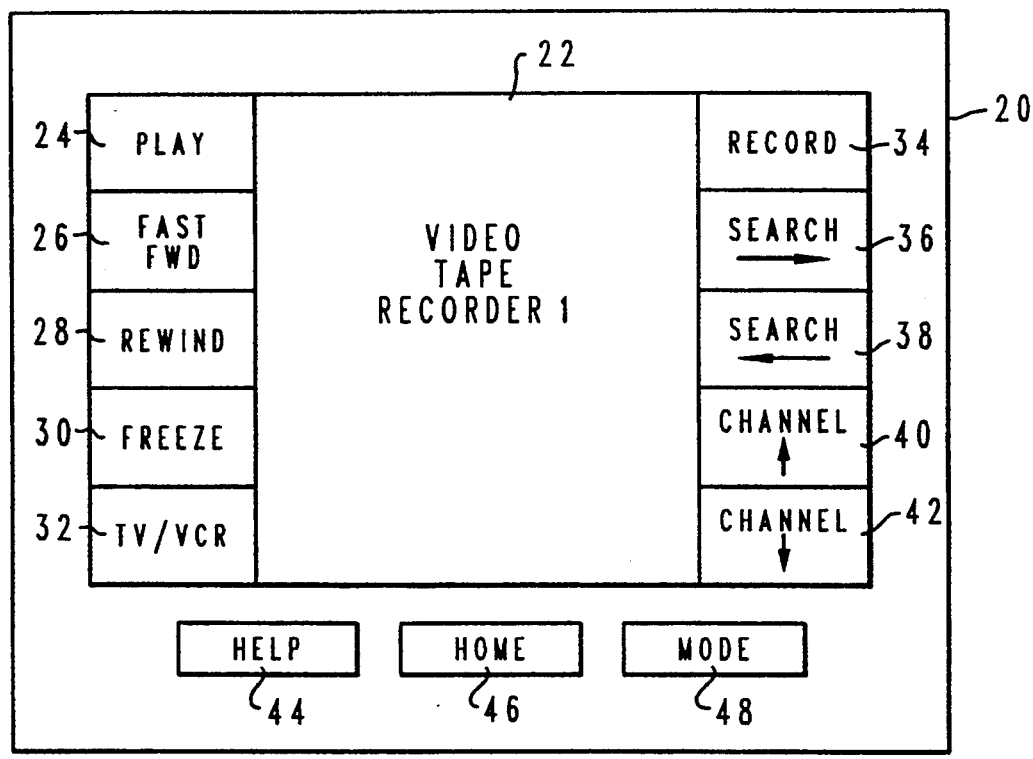
FIGS. 2a-2c are pictorial representations of electrically alterable keypad designations utilized with the multimodal remote control device of the present invention.
Figure 2B:
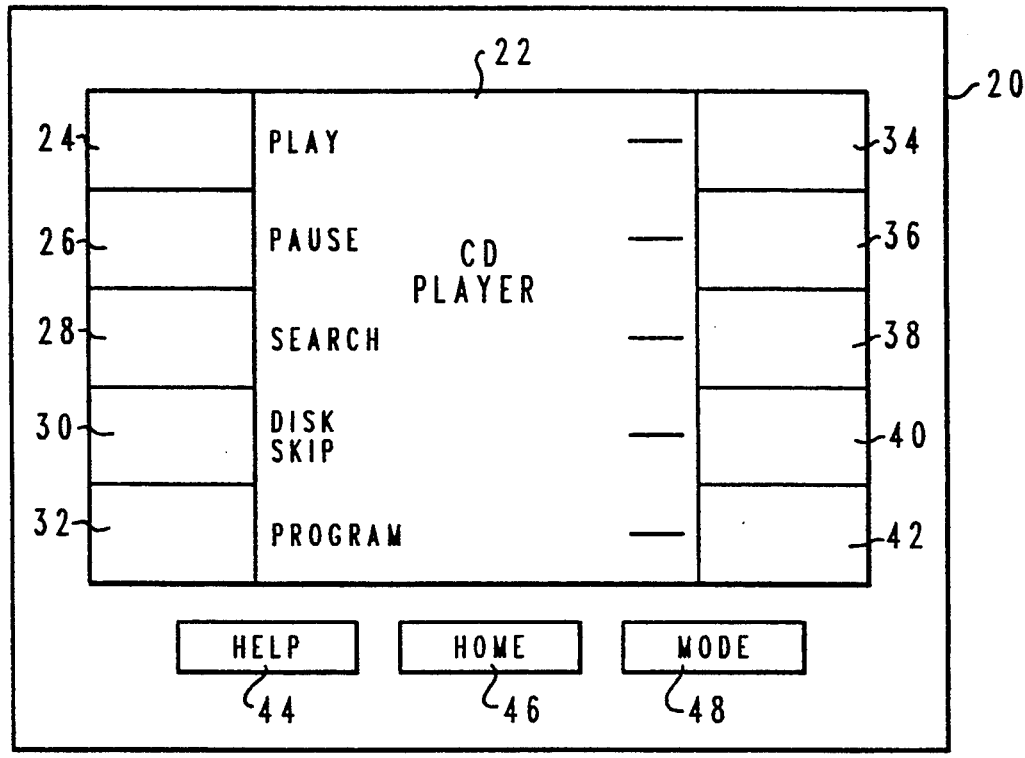
Figure 2C:
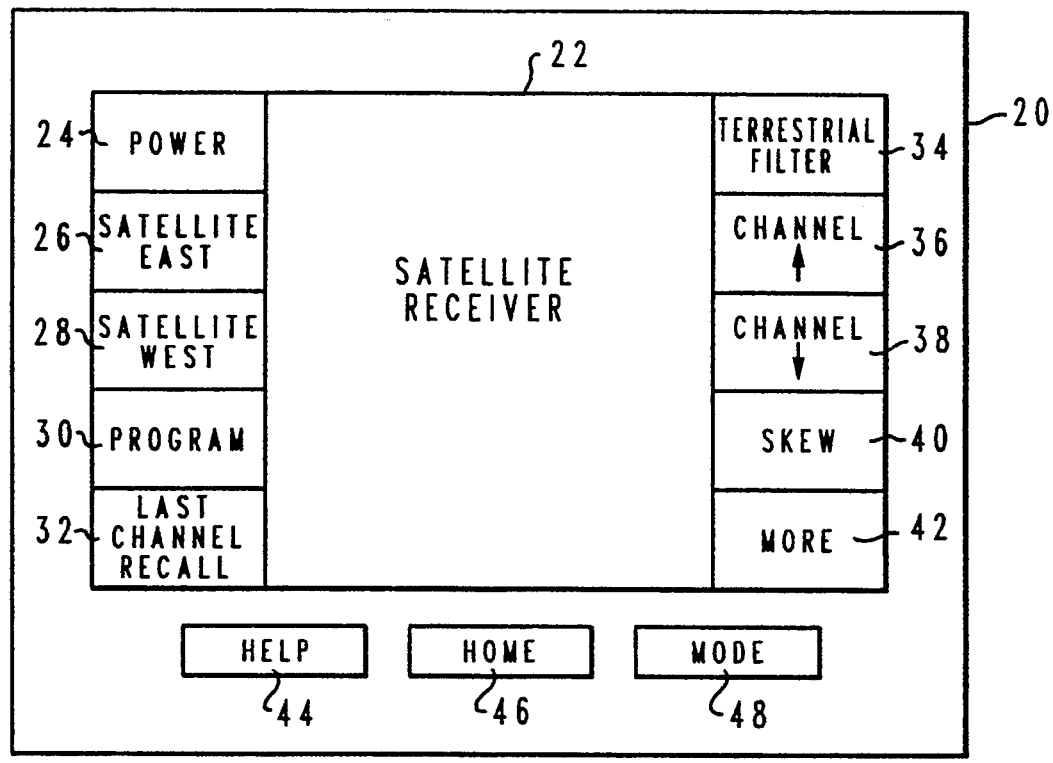

Referring now to FIGS. 2a-2c, there are depicted various pictorial representations of electrically alterable keypad designations which may be utilized with multimodal remote control device 10 of the present invention. As illustrated in FIG. 2a, graphic display 22 is utilized to provide a textual designation of a particular multimedia processing unit which is to be controlled by multimodal remote control device 10 during the current mode of operation. As may be seen, each user selectable keypad 24-42 includes a textual and/or graphic designation which may be utilized to identify a particular function within Video Tape Recorder 1 which may be selected by the user depressing an associated user selectable keypad.

Those skilled in the art will appreciate that user selectable keypads 24-42 may be provided utilizing a plurality of mechanical switches with each textual and/or graphic designation being provided in an adjacent portion of graphic display 22 (see FIG. 2b) or, in the embodiment depicted within FIG. 2a, each user selectable keypad 24-42 may be provided by utilizing a touch overlay which is disposed in an overlying relationship with graphic display 22.

Thus, in the embodiment depicted within FIG. 2a, user selectable keypad 24 may comprise a touch overlay disposed in an overlying relationship with a portion of graphic display 22 which is utilized to generate the textual indication "PLAY" in the manner depicted. In this manner, a relatively limited number of user selectable keypads (10 in the depicted embodiment) may be utilized to control a large number of functions within a multimedia processing unit by providing an electrically alterable keypad designation which illustrates visually the particular function which may be selected by operation of an associated keypad.

Altering the mode of operation of multimodal remote control device 10 utilizing mode button 48 or by utilizing one of user selectable keypads 24-42, will, in accordance with an important feature of the present invention, alter the keypad designations which are provided utilizing graphic display 22. Further, the selection of HELP button 44 will, in a manner which will be explained in greater detail herein, will cause the presentation within graphic display 22 of a textual HELP message associated with a particular user selectable keypad. Thus, by depressing HELP button 44 and a selected one of user selectable keypads 24-42, a textual help message associated with a function associated with that user selectable keypad may be displayed within graphic display 22. Finally, HOME button 46 may be depressed to return multimodal remote control device 10 to a particular starting point which has been designated by the user.

Referring specifically now to FIG. 2b, a second embodiment of multimodal remote control device 10 of the present invention is illustrated. As depicted herein, user selectable keypads 24-42 comprise actual mechanical keypads and the alterable graphic designation associated with each keypad is displayed adjacent to an associated keypad within graphic display 22. Thus, upon reference to FIGS. 2a and 2b, those skilled in the art will appreciate that multimodal remote control device 10 of the present invention may be implemented utilizing either actual keypads having an associated electrically alterable graphic designation displayed in a position adjacent to each keypad or by utilizing a virtual keypad comprising a touch overlay disposed in an overlying relationship with a liquid crystal display, in the manner depicted within FIG. 2a.

Referring now to FIG. 2c, a virtual keypad implementation of multimodal remote control device 10 is depicted wherein user selectable keypads 24-42 are provided utilizing a touch overlay in association with graphic display 22. However, user selectable keypad 42 now includes the graphic designation "MORE" which may be utilized to select subsequent, or alternate menus for a particular multimedia processing unit. For example, satellite receivers or Integrated Receiver/Decoders (IRD) often include a large number of highly complex controls. By providing a series of nested menus and dedicating at least one of user selectable keypads 24-42 to permit the user to select subsequent menus, a highly complex device, such as a satellite receiver, may be simply and easily controlled utilizing multimodal remote control device 10 of the present invention.

Figure 3:
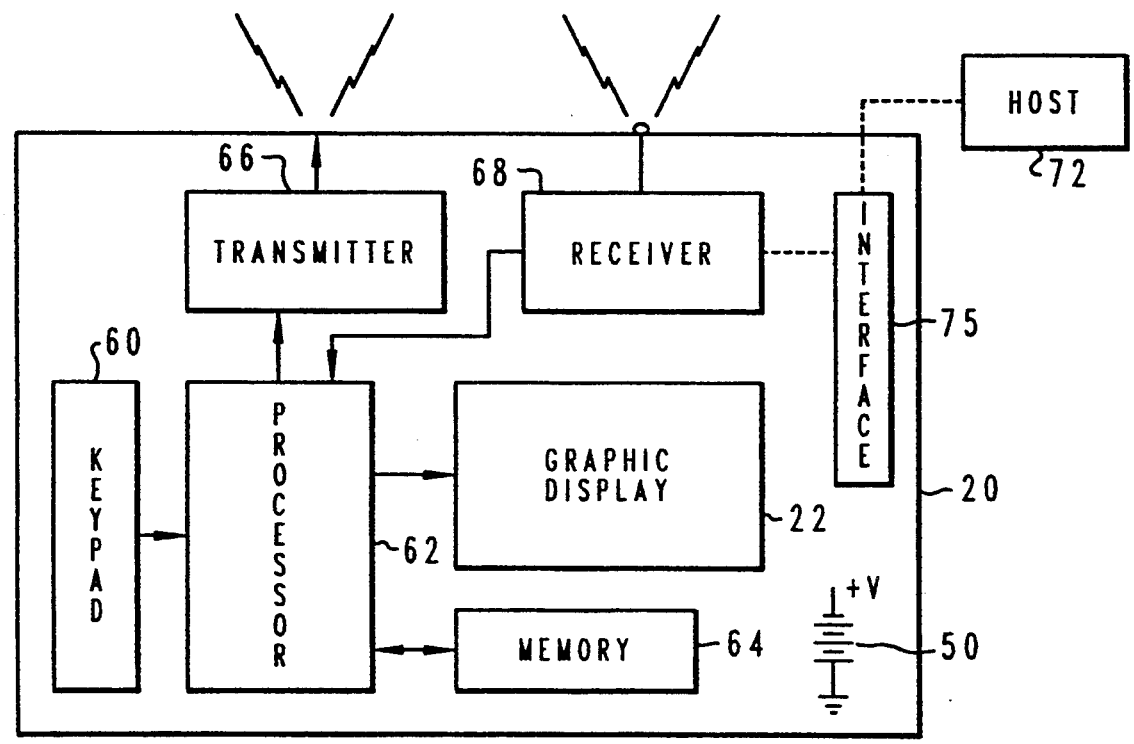
FIG. 3 is a high level block diagram of the major electronic components of one embodiment of the multimodal remote control device of the present invention.

With reference now to FIG. 3, there is depicted a high level block diagram of the major electronic components of one embodiment of multimodal remote control device 10 of the present invention. As illustrated, these components are mounted within case 20 and the illustration includes a block diagram representation of graphic display 22. As described above, graphic display 22 comprises a liquid crystal display in one preferred embodiment of the present invention. Graphic display 22 is coupled to processor 62, which preferably comprises an appropriately programmed microprocessor, which may be utilized to control graphic display 22 and to scan keypad 60 in a manner well known in the art. As described above, keypad 60 may comprise a touch overlay, or a plurality of mechanical keypads disposed adjacent to graphic display 22. Thus, depression of a selected key within keypad 60 will, in a manner well known to those skilled in the art, cause processor 62 to couple an appropriate command to transmitter 66. Transmitter 66 then transmits an appropriately coded control signal utilizing infrared, radio frequency, or other suitable media, to one of a plurality of multimedia processing units, in order to initiate a particular function therein.

In accordance with an important feature of the present invention, multimodal remote control device 10 also preferably includes a receiver 68. Receiver 68 may comprise an infrared receiver or, in an alternate embodiment of the present invention, receiver 68 may be coupled to a host 72 via a standard interface 70, such as the RS-232 interface. Thus, processor 62 may receive menus, textual help messages and additional programming information from a controlled multimedia processing unit, or host 72, and store that information within memory 64 in association with processor 62. In this manner, multimodal remote control device 10 may be programmed with appropriate information necessary to control a large number of multimedia processing units and, the amount of confusion encountered by the user is minimized by providing a relatively small number of keypads, each associated with an electrically alterable graphic designation, wherein a particular function associated with that keypad in a particular mode of operation may be visually determined. Additionally, FIG. 3 also depicts battery 50 which, in a manner well known to those skilled in the electronic art, may be utilized to provide the necessary electrical power to operate the depicted electronic components within multimodal remote control device 10.

Figure 4:
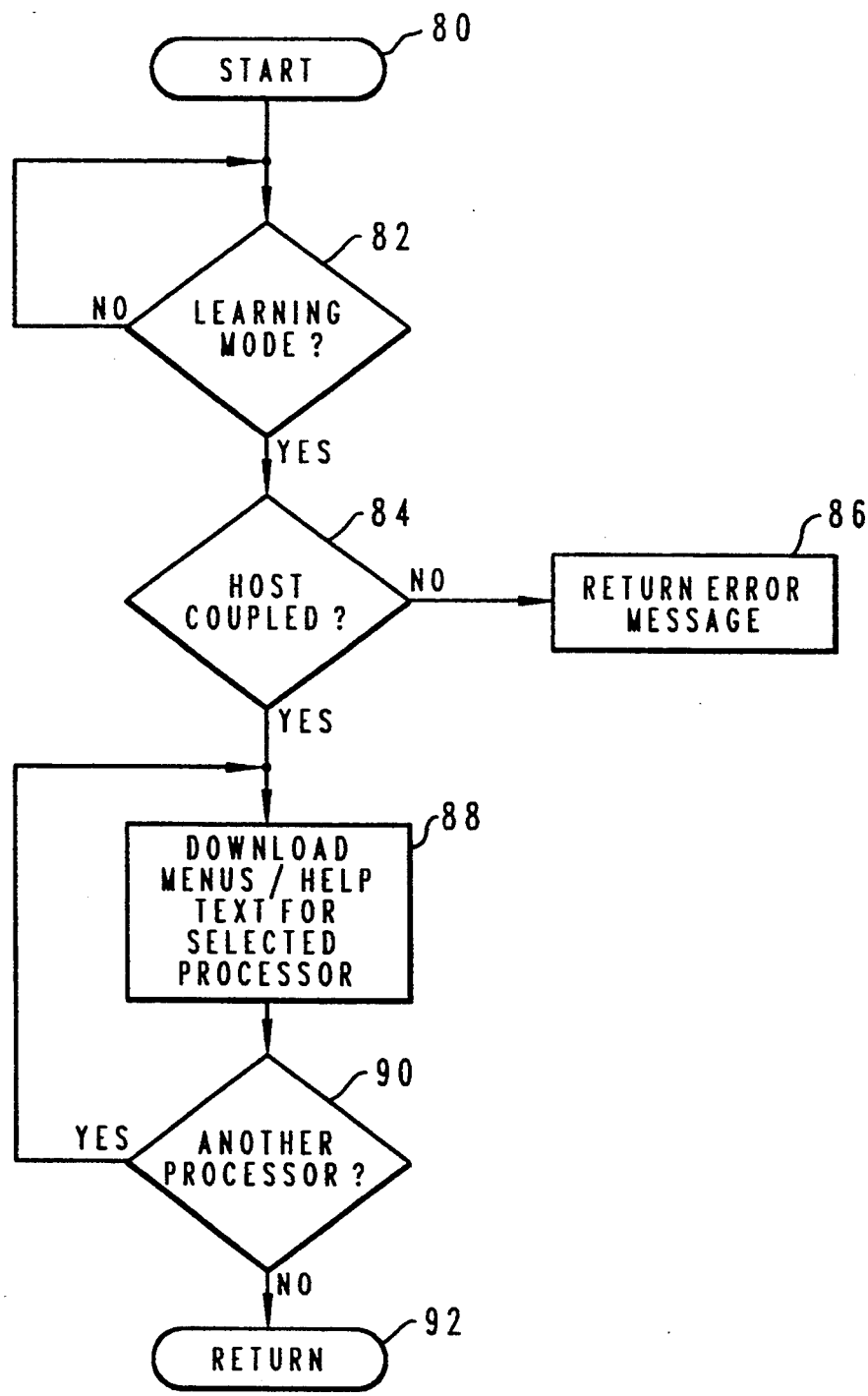
FIG. 4 is a high level logic flow diagram of the learning mode of the multimodal remote control device of the present invention.

Referring now to FIG. 4, there is depicted a high level logic flow diagram of the learning mode of multimodal remote control device 10 of the present invention. As illustrated, this process begins at block 80 and thereafter passes to block 82 which depicts a determination of whether or not the learning mode has been selected. If not, the process merely iterates until such time as the learning mode has been selected. Upon a determination that the learning mode has been selected, the process passes to block 84. Block 84 illustrates a determination of whether or not a host has been coupled to multimodal remote control device 10 utilizing receiver 68 and an infrared or radio frequency link, or alternately, utilizing interface 70 which provides a hard wired coupling to host 72 (see FIG. 3). In the event no host is coupled to multimodal remote control device 10, block 86 illustrates the returning of an error message utilizing graphic display 22, in a manner well known in the art.

Referring again to block 84, in the event the learning mode has been entered and a host device is coupled to multimodal remote control device 10, block 88 illustrates the downloading of appropriate menus/help data for a particular multimedia processing unit to be stored within memory 64 within multimodal remote control device 10. Thereafter, the process passes to block 90. Block 90 illustrates a determination of whether or not a series of menus and help data is to be loaded for a subsequent multifunction processor, and if so, the process returns iteratively to block 88 to download that information to multimodal remote control device 10. In the event no additional multimedia processor data is to be loaded, the process passes to block 92 and returns.

Figure 5:
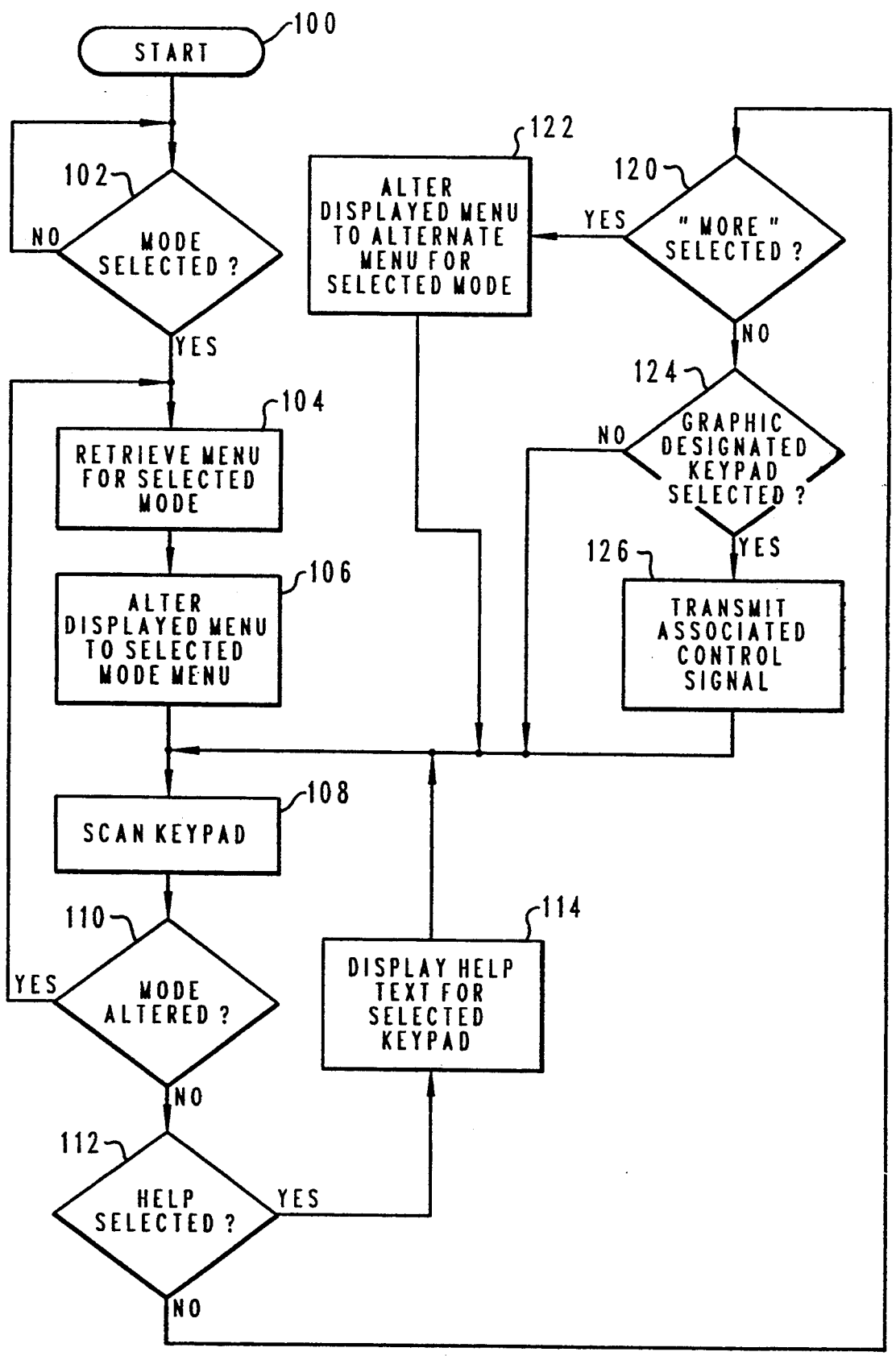
FIG. 5 is a high level logic flow diagram of the operation of the multimodal remote control device of the present invention.

Finally, with reference to FIG. 5, there is depicted a high level logic flow diagram of the operation of multimodal remote control device 10 of the present invention. As illustrated, this process begins at block 100 and thereafter passes to block 102 which depicts a determination that a mode has been selected. As those skilled in the art will appreciate upon reference to the foregoing a mode may be selected utilizing multimodal remote control device 10 by the selection of HOME key 46, MODE key 48, or a graphically designated "MORE" key, in the depicted embodiment of the present invention. If no mode has been selected, the process merely iterates until such time as a mode of operation has been selected.

Referring again to block 102, in the event a mode has been selected, the process passes to block 104 which illustrates the retrieval of the menu for the selected mode of operation. Thereafter, the process passes to block 106 which depicts the altering of the displayed menu to the appropriate menu for the selected mode. As described above, this may be accomplished by altering the graphic and/or textual designations provided within graphic display 22, in the manner described within FIGS. 2a–2c.

Next, the process passes to block 108 which illustrates the scanning of the keypad to detect an operator input. This process continues, as depicted at block 110, in which a determination is illustrated as to whether or not the mode of operation has been altered. If so, the process returns to block 104 to retrieve the menu for the newly selected mode of operation and the process returns iteratively in the manner described. In the event the mode of operation has not been altered, as depicted at block 110, the process passes to block 112. Block 112 illustrates a determination of whether or not the HELP key has been selected. If so, the process passes to block 114 which illustrates the displaying of the HELP text for a selected keypad, in the manner described above. The process then returns to block 108 to continue to scan the keypad for subsequent operator inputs.

Referring again to block 112, in the event the mode of operation has not been altered and the HELP key has not been selected, the process passes to block 120. Block 120 illustrates a determination of whether or not a "MORE" key has been selected. If so, the process passes to block 122. Block 122 illustrates the altering of the display within graphic display 22 to depict an alternate menu for the selected mode of operation. The process then returns to block 108 to continue scanning the keypad.

Referring again to block 120, in the event the "MORE" key has not been selected, the process passes to block 124. Block 124 illustrates a determination of whether or not a graphically designated keypad has been selected and if not, the process passes back to block 108 to continue scanning the keypad as illustrated. Referring again to block 124 in the event a graphically designated keypad has been selected, block 126 illustrates the transmission of the associated control signal via transmitter 66 (see FIG. 3) in the manner described above. Thereafter, the process passes to block 108 to continue scanning the keypad.

Upon reference to the foregoing those skilled in the art will appreciate that the Applicant herein has provided a novel, unobvious and useful multimodal remote control device which provides a highly intuitive and highly usable interface through which a user may selectively control multiple functions in a plurality of multimedia processing units. By providing a relatively few number of user selectable keypads, each having an electrically alterable graphic designation associated therewith, many modes of operation may be supported while clearly illustrating to the user each designated function associated with a user selectable keypad within each mode of operation.

While the invention has been particularly shown and described with reference to a preferred embodiment, it will be understood by those skilled in the art that various changes in form and detail may be made therein without departing from the spirit and scope of the invention.

I claim:

1. A hand-held remote control device having a plurality of modes of operation for selecting designated functions in a plurality of multimedia processing units, said remote control device comprising:

a mode key for selecting a mode of operation from said plurality of modes of operation in response to an operation thereof;

a plurality of function keys;

wireless transmission means coupled to said plurality of function keys for transmitting a selected control signal to a particular one of said plurality of multimedia processing units in response to an operation of a selected one of said plurality of function keys during a mode of operation associated with said particular one of said plurality of multimedia processing units wherein a designated function in said particular one of said plurality of multimedia processing units is selected;

different electrically alterable graphic designations disposed in association with respective ones of said plurality of function keys wherein different designated functions in said particular one of said plurality of processing units associated with respective ones of said plurality of function keys are visually determined, at least one of said electrically alterable graphic designations which is associated with at least one particular said function key visually indicating the existence of additional designated functions in said particular one of said plurality of multimedia processing units; and means for selectively varying said electrically alterable graphic designation associated with each one of said plurality of function keys in response to an operation of said mode key or said particular function key.

2. The hand-held remote control device according to claim 1, wherein said wireless transmission means comprises an infrared transmitter.

3. The hand-held remote control device according to claim 1, further including an infrared receiver for receiving data from said plurality of multimedia processing units.

4. The hand-held remote control device according to claim 1, further including a graphic display.

5. The hand-held remote control device according to claim 4, wherein said plurality of function keys are disposed adjacent to said graphic display and wherein each electrically alterable graphic designation is displayed within said graphic display at a location adjacent to its respective function key.

6. The hand-held remote control device according to claim 4, wherein each of said plurality of function keys comprises a touch overlay disposed in overlying relationship with at least a portion of said graphic display.

7. The hand-held remote control device according to claim 4, wherein said graphic display comprises a liquid crystal display.

* * * * *